United States Patent [19]
Sukigara et al.

[11] Patent Number: 6,057,974
[45] Date of Patent: May 2, 2000

[54] MAGNETIC DISK STORAGE DEVICE CONTROL METHOD, DISK ARRAY SYSTEM CONTROL METHOD AND DISK ARRAY SYSTEM

[75] Inventors: Tsutomu Sukigara, Odawara; Hidehiko Iwasaki, Hiratsuka; Takashi Takenaka, Odawara; Mitsuhiko Oguchi, Ebina; Yuichi Otani, Yokohama, all of Japan

[73] Assignee: Hitachi, Ltd., Tokyo, Japan

[21] Appl. No.: 08/896,761

[22] Filed: Jul. 18, 1997

[30] Foreign Application Priority Data

Jul. 18, 1996 [JP] Japan .................................. 8-189601

[51] Int. Cl.[7] .................................................. G11B 15/48
[52] U.S. Cl. ........................ 360/74.1; 360/73.01; 360/69
[58] Field of Search ............................... 360/74.1, 73.01, 360/73.03, 71, 69, 61, 75; 365/227, 226; 395/750

[56] References Cited

U.S. PATENT DOCUMENTS 5,691,948 11/1997 Sakabe .................................... 365/227

FOREIGN PATENT DOCUMENTS 6-230903 8/1994 Japan .

*Primary Examiner*—Muhammad Edun
*Attorney, Agent, or Firm*—Antonelli, Terry, Stout & Kraus, LLP

[57] ABSTRACT

A method and system which prevents starting-up problems in plural magnetic disk storage devices included in a disk array system during restart following halt of the magnetic disk storage devices after long term operation. The disk array system includes the plural magnetic disk storage devices, a microprocessor unit (MPU) which controls the magnetic disk storage devices, a control memory, a parity calculator, and cache memory. The control memory contains a operation time control table in which a tolerable continuous operation time Ti and a halt time Ts are stored. Each of the magnetic disk storage devices is intentionally stopped individually for the halt time Ts at time interval of the tolerable continuous operation time Ti. A request for reading data from one magnetic disk storage device under halt is responded to by using a data recovery function, while a request for writing data to a magnetic disk storage device under halt is responded to by writing data to an alternate spare magnetic disk storage device or memory.

48 Claims, 13 Drawing Sheets

MAGNETIC DISK STORAGE DEVICE CONTROL METHOD, DISK ARRAY SYSTEM CONTROL METHOD AND DISK ARRAY SYSTEM

BACKGROUND OF THE INVENTION

The present invention relates to a method and system for use in a magnetic disk storage device or a disk array system having plural magnetic disk storage devices for improving their reliability. More particularly, the present invention relates to a method and system for use in a magnetic disk storage device or disk array system for controlling the relationship between the stopping time of a magnetic disk storage device and the interval of operation time of the magnetic disk storage device so as to improve its reliability.

A disk array system known as a RAID (Redundant Array of Inexpensive Disks) system is becoming popular owing to its low price and high reliability and the fact that a disk array system can be easily recovered, even if one of the magnetic disk storage devices included in the disk array system is halted due to some difficulty.

A data recovery method is, for example, disclosed in unexamined Japanese patent publication 6-230903. Namely, when one of the magnetic disk storage devices in the disk array system has failed, correct data is recovered using the data and parity data in the other healthy magnetic disk storage devices. The recovered data is stored in open areas in the healthy magnetic disk storage devices, if the total capacity in the open areas in the healthy magnetic disk storage devices is greater than the amount of data stored in the failed magnetic disk storage device.

However, when plural magnetic disk storage devices have failed at the same time, no particularly effective recovering method other than transferring data from a backup system is available. Thus, such a recovery is beyond conventional methods. Therefore, the occurrence of a failure in plural magnetic disk storage devices at the same time may result in a severe loss of data.

Recording and retrieving data in a magnetic disk storage device is performed by a magnetic head disposed adjacent to a rotating magnetic disk in a head floating space. As magnetic disk storage devices improve the head floating space is decreased because data recording density on the magnetic disk is nearly inversely proportional to the head floating space. In order to obtain a smaller head floating space, the Contact Start Stop (CSS) system is used. The CSS system is a system in which the magnetic head contacts the magnetic disk surface by a pressing force governed by the magnetic head suspension apparatus when the magnetic disk has stopped, and floats at a desired space above the magnetic disk surface when the rotating speed of the magnetic disk has reached a predetermined speed. The magnetic head floats above the surface of the magnetic disk due to a floating force induced by an air-flow on the magnetic disk surface as the magnetic disk rotates. The floating force is balanced by the pressing force generated by the magnetic head suspension apparatus. CSS systems are commonly utilized in conventional magnetic disk storage devices.

In CSS systems, consideration should be given to the tendency over time for the magnetic heads to stick to the magnetic disk surfaces, thereby causing problems during start-up of magnetic disk rotation. Sticking occurs due to the build-up of materials such as contaminants and lubricants in the gap between the magnetic head and the magnetic disc during long term operation of the magnetic disk storage device. Severe sticking between the magnetic head and the magnetic disk is caused by surface tension or sticking force of the contaminants and lubricants when the magnetic head contacts the magnetic disk at the time the rotation of the magnetic disk has been halted. Thus, there are technical problems to be solved in CSS systems in which starting-up problems due to the above-described sticking problem might occur during restart when the magnetic disk storage device has been halted after long term continuous operation. There are no techniques in the conventional technology for addressing this problem.

Therefore, there is great concern to avoid causing simultaneous starting-up problems in plural magnetic disk storage devices of a disk array when the magnetic disk storage devices are stopped after long term continuous operation. Simultaneous starting-up problems in the magnetic disk storage devices of a disk array could cause fatal damage to the magnetic disk storage devices thereby making data recovery impossible. Such fatal damage could be even worse in a data security system where data is recovered only by generating redundant data such as parity data.

SUMMARY OF THE INVENTION

An object of the present invention is to provide a method and system for use in a magnetic disk storage device for preventing damage such as starting-up problems at restart of a magnetic disk storage device which has been halted after long term continuous operation.

Another object of the present invention is to provide a method and system for use in a magnetic disk storage device for preventing simultaneous starting-up problems in plural magnetic disk storage devices included in a RAID system, thereby maintaining high reliability of the RAID system.

Yet another object of the present invention is to provide a method and system for use in a disk array system that allows the disk array system to respond to data read-in and data write-in requests even while the magnetic disk storage devices are being stopped at predetermined intervals so as to prevent simultaneous starting-up problems in the magnetic disk storage devices at restart.

In the present invention it was discovered that in a magnetic disk storage device there is a relationship between the stopping time of the magnetic disk storage device and the interval of operation time. More particularly, it was discovered that if the magnetic disk storage device operated according to the CSS system is intentionally stopped at intervals related to the interval of operation time of the magnetic disk storage device then the possibility of occurrence of starting-up problems in the magnetic disk storage device after the magnetic disk storage device has been halted can be reduced.

It was further discovered that the length of the interval of the stopping time necessary to reduce starting-up problems in a magnetic disk storage device is related to the type of magnetic disk storage device. In other words, a magnetic disk storage device of a first type may require an interval of stopping time longer than the interval of stopping time of a magnetic disk storage device of a second type. Further the length of the interval of operation time during which safe normal operation can be conducted, varies according to the type of magnetic disk storage device. The length of the stopping time can be several minutes to ten (10) hours whereas the length of interval of operation time can be as long as one thousand (1000) hours.

Therefore, the present invention provides a method and system for use in controlling the operation of a magnetic disk storage device so as to intentionally stop the magnetic disk storage device at an interval of stopping time related to the interval of operation time of the magnetic disk storage device so as to improve reliability of the magnetic disk storage device.

The disk array system of the present invention utilizes the function of a RAID system such as that disclosed in unexamined Japanese patent publication 6-230903 of keeping operation recovery data in another magnetic disk storage device for use when one of the magnetic disk storage devices within the disk array system has been stopped due to a failure. By using this function along with the present invention the disk array system can continue to operate even though each magnetic disk storage device is intentionally stopped for a period of time. However, intentionally stopping the magnetic disk storage devices of the disk array system as described above makes access to the magnetic disk storage device for reading and writing operations impossible.

According to the present invention the magnetic disk storage devices of a disk array system are stopped one by one in sequence in a specified interval without stopping the disk array system. Thus, the disk array system is allowed to continue operation even though each of the magnetic disk storage devices is stopped sequentially to prevent starting-up problems in each magnetic disk storage device. As described above, the starting-up problems result from sticking of the magnetic head to the magnetic disk at restart of the magnetic disk storage device after it has been halted after long term operation. Conducting the sequential stopping prevents a complete failure of the disk array system.

As each magnetic disk storage device is halted in the manner described above, an access to the magnetic disk storage device in the form of a request for data read-out can not be responded to by the magnetic disk device. However, the present invention responds to the request for data read-out by initiating the RAID system data recovery function wherein recovered data corresponding to the data read-out request is generated using the operation recovery data in the other magnetic disk storage devices. The RAID system data recovery function is normally executed when the magnetic disk storage device has been stopped due to a failure. In the present invention the RAID system data recovery function is used to respond to a data read-out request when the magnetic disk storage device has been stopped to prevent starting-up problems in subsequent restarts.

Further, when a magnetic disk storage device has been halted in the manner described above a request for data write-in to the magnetic disk storage device which has been halted can be responded to by dispersively recording only the write-in data to the other magnetic disk storage devices without calculating parity data. Alternatively in order to maintain data integrity, parity data can be calculated. Further, the write-in data can be temporarily stored in an alternate memory separate from the magnetic disk storage devices. After the magnetic disk storage device has been restarted the write-in data temporarily stored in the alternate memory is transferred from the alternate memory to the restarted magnetic disk storage device.

If time zones where no data write-in requests are issued are known in advance, for example, according to an operating schedule, then plural magnetic disk storage devices can be stopped in those time zones. In such a case the alternate memory can be eliminated since no request for data write-in should be issued nor responded to. The time zones where few data write-in requests are issued can alternatively be detected based on statistical information of actual operation that occurred in the past.

The alternate memory can also be eliminated by using a device-busy signal when the magnetic disk storage device has been halted. The device-busy signal is sent to the source that issued the data write-in request. The source upon receiving the device-busy signal seeks to write the data elsewhere or attempts to write the data to the magnetic disk storage device at a later time.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

According to the present invention it was discovered that in a magnetic disk storage device which is operated using the CSS system there is a relationship between the stopping time of the magnetic disk storage device and the interval of operation time. More particularly, it was discovered that if the magnetic disk storage device operated according to the CSS system is intentionally stopped at intervals related to the interval of operation time of the magnetic disk storage device then the possibility of occurrence of starting-up problems in the magnetic disk storage device after the magnetic disk storage device has been halted can be reduced.

It was further discovered that the length of the interval of the stopping time necessary to reduce starting-up problems in a magnetic disk storage device is related to the type of magnetic disk storage device. In other words, a magnetic disk storage device of a first type may require an interval of stopping time longer than the interval of stopping time of a magnetic disk storage device of a second type. Further the length of the interval of operation time during which safe normal operation can be conducted, varies according to the type of magnetic disk storage device. The length of the stopping time can be several minutes to ten (10) hours whereas the length of interval of operation time can be as long as one thousand (1000) hours.

The following is a description of the present invention as it relates to a method and system for use in controlling the operation of a magnetic disk storage device or disk array system operated according to the CSS system to improve reliability thereof.

Figure 1:
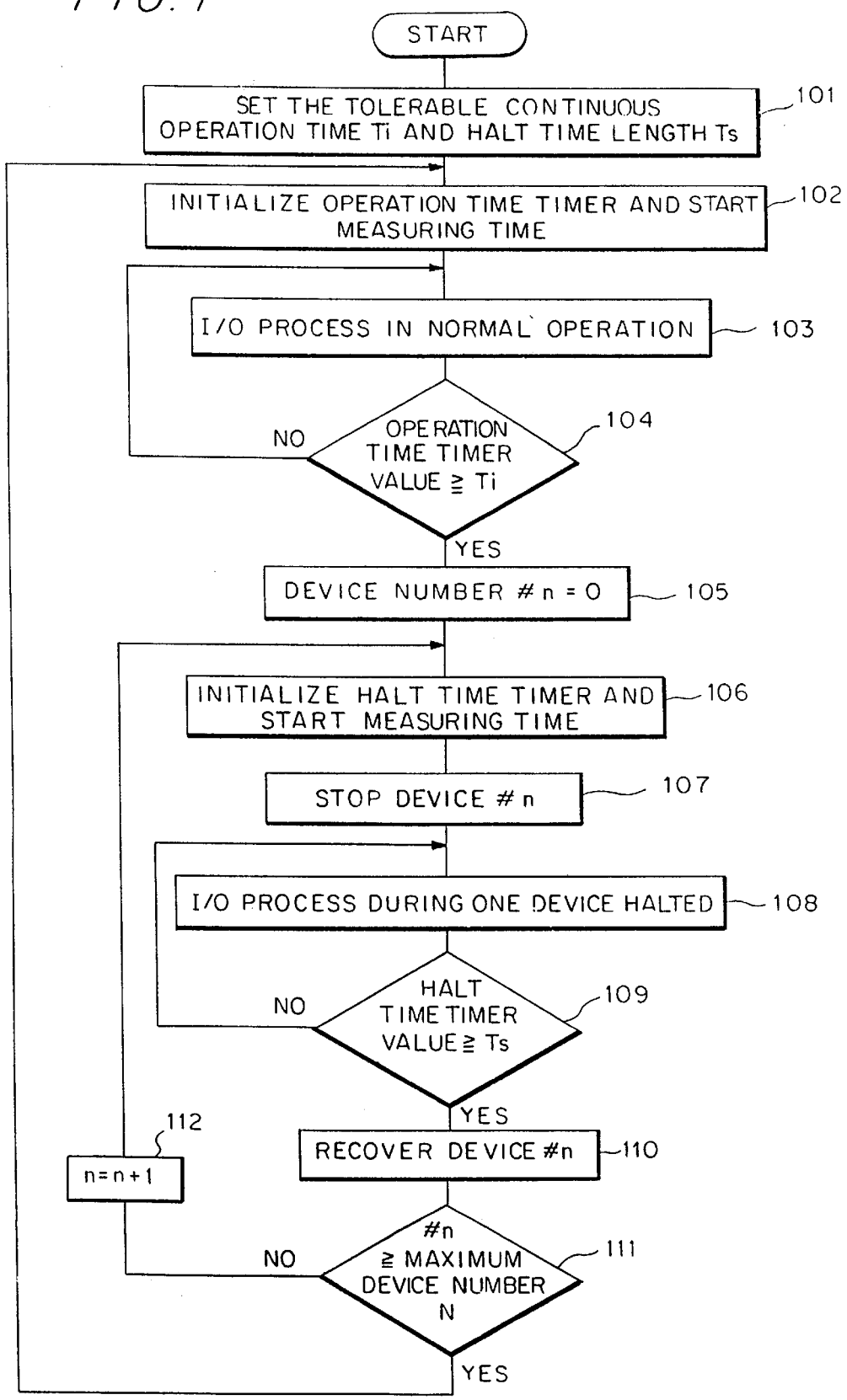
FIG. 1 is a flowchart illustrating the functions of a disk array system according to the present invention.
Figure 2:
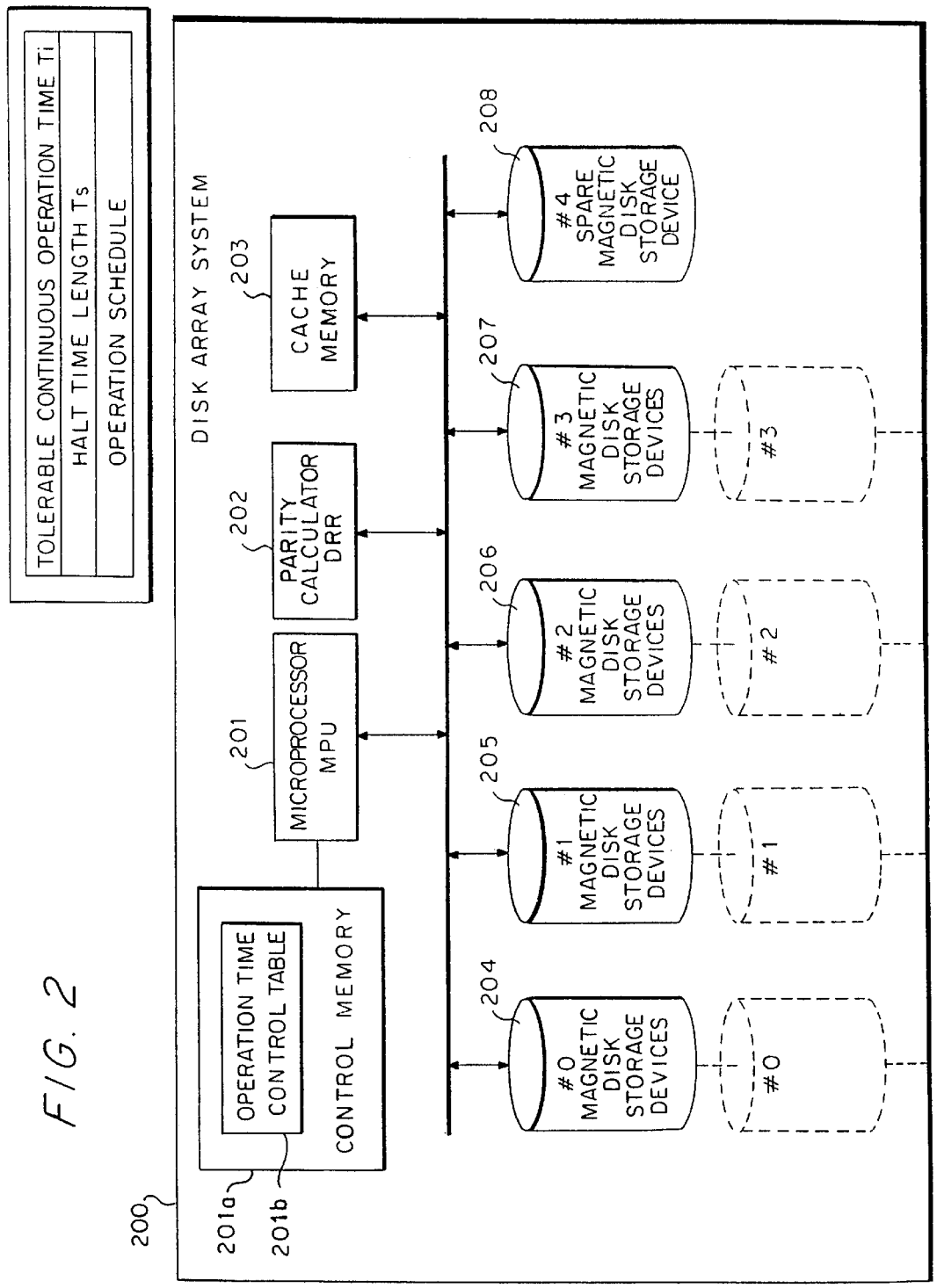
FIG. 2 is a block diagram illustrating the construction of a disk array which functions according to the present invention.
Figure 9:
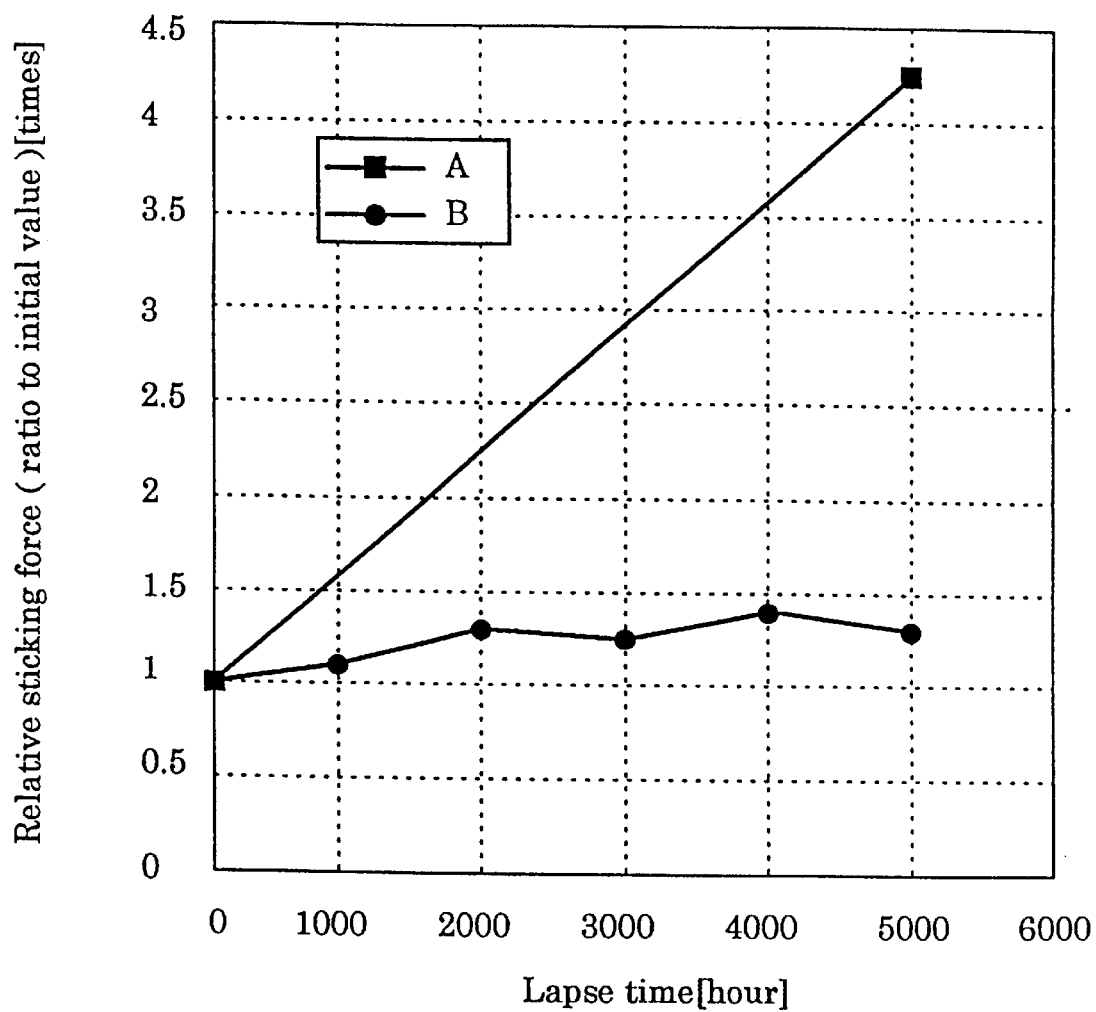
FIG. 9 is a diagram illustrating the relationship of sticking force between the magnetic head and the magnetic disk to the operation time of the magnetic disk storage device.
Figure 10:
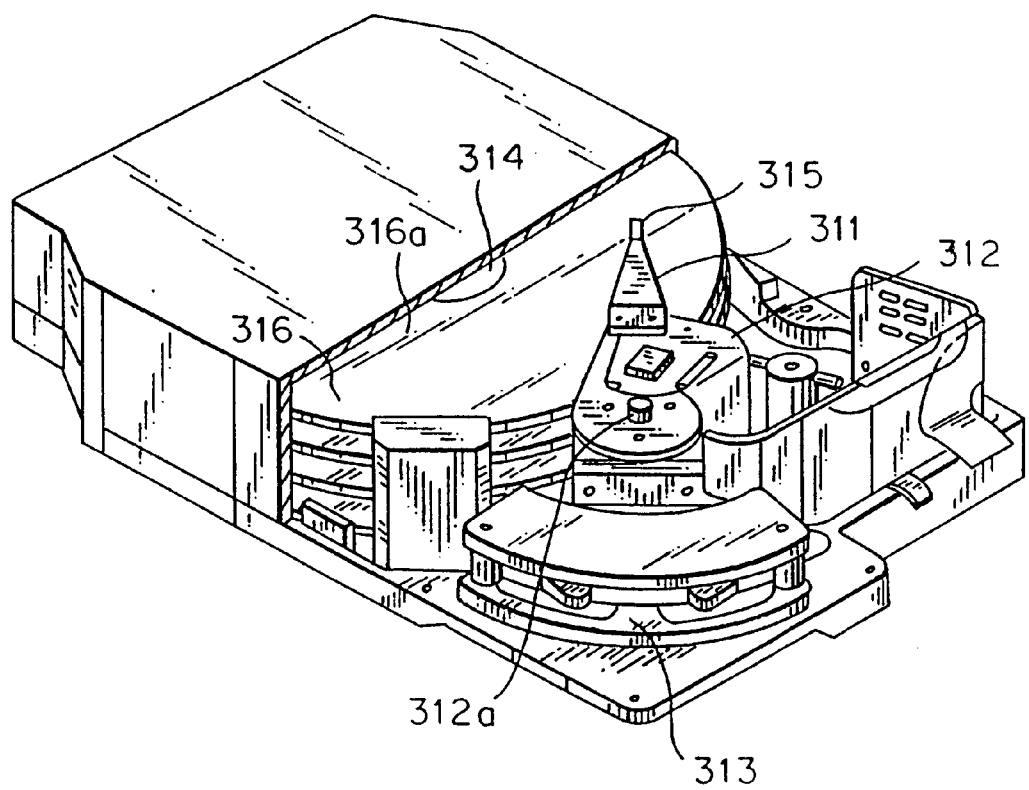
FIG. 10 is a diagram illustrating a sectional view of the disk array system including plural magnetic disk storage devices according to the present invention.

FIG. 1 illustrates a flowchart explaining an example of the functions of a disk array system according to the present invention. FIG. 2 is a block diagram illustrating the construction of a disk array system which functions according to the present invention. FIGS. 3, 4, 5, 6, 7 and 8 are conceptual diagrams explaining the functions of a disk array system according to the present invention. FIG. 9 is a diagram graphically illustrating the relationship of sticking force between the magnetic head and the magnetic disk to the operation time of the magnetic disc storage device. FIG. 10 is a diagram illustrating a sectional view of plural magnetic disk storage devices included in a disk array system according to the present invention.

The hardware of the disk array system of the present invention will be explained by referring to FIG. 2. 200 illustrates a disk array system as a whole. 204 through 207 are magnetic disk storage devices forming the first array (a disk array system has plural arrays in general). 208 is a spare magnetic disk storage device which plays a role of an alternate magnetic disk storage device if a problem occurs in one of the magnetic disk storage devices 204 through 207. 203 is a cache memory and 202 is a parity calculator (DRR). Data read-out and data write-in requests from the host are processed through cache memory 203 and DRR 202.

For example, for data write-in, successive data from the host are temporarily stored in the cache memory 203, parity data PD is generated through DRR 202 and then dispersively stored in the magnetic disk storage devices 204 through 207. For data read-out, requested data is read out from the magnetic disk storage devices 204 through 207, transferred to the cache memory 203 and merged and returned to the host.

In the case when any one magnetic disk storage device in the array has failed, the read-out process is performed by calculating data that might have been stored in the failed magnetic disk storage device, from data dispersed on the normal magnetic disk storage devices in the array through DRR 202. These series of processes are performed by a microprocessor 201 (MPU) by controlling the DRR 202, the cache memory 203, the magnetic disk storage devices 204 through 207 and the spare magnetic disk storage device 208.

The structure of each of the magnetic disk storage devices 204 through 207 and spare magnetic disk storage device 208 included in the disk array system are illustrated in FIG. 10. In each magnetic disk storage device 204–207, plural magnetic disks 316 are fixed to a common spindle 314 in a fixed spacing in a coaxial and parallel manner. Magnetic heads 315 each are independently suspended on the front end of each loading arm 311 and are faced to the recording surface of each magnetic disk 316. The bottom end of a loading arm 311 is suspended by an actuator 312 which swings around a pivot shaft 312a. The actuator 312 is driven by a voice-coil motor 313.

The actuator 312 and the loading arms 311 make a swinging movement in a plane parallel to the magnetic disks 316. The velocity and the angle of the actuator 312 and the loading arms 311 are controlled by direction and amount of current to the voice-coil motor 313. By the swinging movement, the magnetic heads 315 suspended on the front end of the loading arms 311 moves to a radial direction on each recording surface of the magnetic disks 316 to move among a plurality of tracks allocated on the recording surfaces in a coaxial manner or follows a desired track.

This embodiment of the magnetic disk storage device adopts a CSS system in which the magnetic heads 315 float on the magnetic disks 316 rotating at a steady speed in a fixed spacing, and contact surface of the magnetic disks 316 when the rotation of the magnetic disk is stopped. Namely, a pressing force to the magnetic disks 316 through the magnetic heads 315 effected by the loading arms 311, is balanced by a floating force generated on the magnetic heads 315 by the airflow on the surface of the magnetic disks 316 rotating at a steady speed. As a result a fixed spacing is formed between the magnetic heads 315 and the magnetic disks 316.

Accordingly, as the rotational speed of the magnetic disks 316 at start-up increases, the magnetic heads 315 gradually float higher, rubbing the surface of the magnetic disks 316 as the rotation speed of the magnetic disks increase. Further, the magnetic heads 315 gradually sink to the surface of the magnetic disks 316 and rubbing the surface of the magnetic disks 316 as the rotational speed of the magnetic disks 316 decreases. Ultimately the magnetic heads 315 contact the magnetic disks 316 when the rotation of the magnetic disks 316 stops. The CSS is usually performed in a specified CSS zone 316a arranged in the innermost area of the magnetic disks 316. This CSS zone 316a is typically not used for usual data recording. According to the CSS the magnetic heads 315 are automatically moved to the CSS zone 316a.

The MPU 201 controls operations as described above using a control program and control information stored in a control memory 201a. In this case, the control memory 201a has usual control information as well as an operation time control table 201b which controls operation times of each of the magnetic disk storage devices 204 through 207 and the spare magnetic disk storage device 208 included in a disk array. Specifically, the control table 201b has control information which causes the intentional individual stopping if the magnetic disk storage devices 204–207 after a specified interval of continuous operation time. The operation time control table 201b, for example has an tolerable continuous operation time Ti indicating tolerable time limit of continuous operation from a view point of preventing sticking problems between a magnetic head and a magnetic disk, and has a halt time length Ts. The operation time Ti can be as long as one thousand (1000) hours whereas the halt time Ts can be several minutes to ten (10) hours. Further, both individually the operation time Ti and the halt time Ts are effected by the type of magnetic disk storage device. The control program of the MPU 201 also has a timer routine to measure continuous operation time of the disk array system 200 and a halt time length of each magnetic disk storage device (not shown). continuous operation time or a halt time length can be measured not only by software using a timer routine described above but also by a hardware timer (not shown). Further, the tolerable continuous operation time Ti and the halt time length Ts can be established not only by the information in the operation time table 201b in the control memory 201, but also by using a hardware such as DIP switches.

Thus, the MPU 201 controls each of the magnetic disk storage devices 204 through 207 and the spare magnetic disk storage device 208 included the disk array so as to stop them individually at a specified interval, by comparing a measured result by the timer routine with the tolerable continuous operation time Ti established in the operation time control table 201b.

Figure 3:
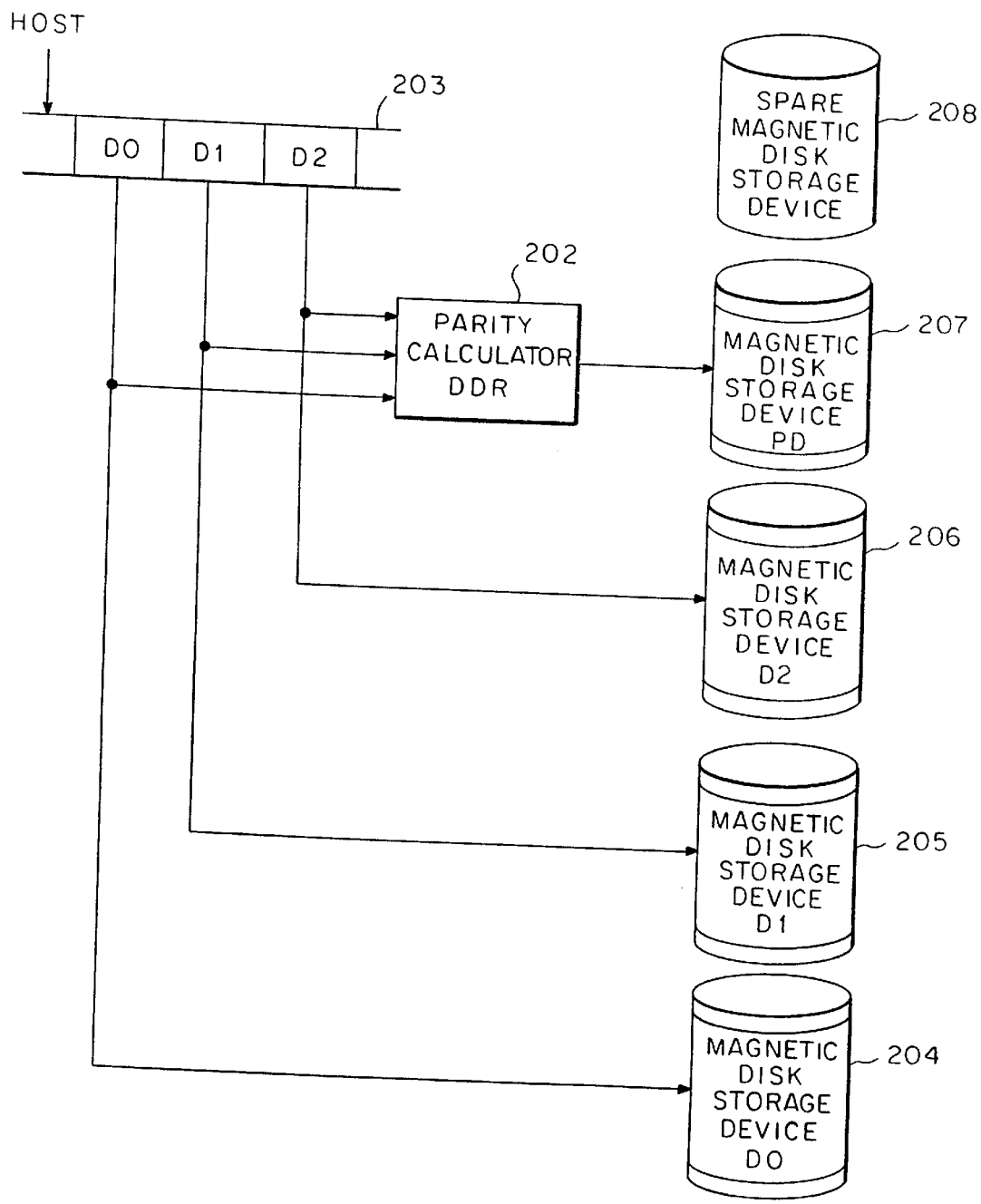
FIG. 3 is a schematic diagram illustrating the functions performed by a disk array system according to the present invention.

FIG. 3 illustrates a process where data D0 through D2 issued by the host is written in the magnetic disk storage devices 204 through 207 included in the disk array system. At first, the data D0 through D2 are stored in the cache memory 203. DRR 202 calculates a parity data PD by using the data D0 through D2. Then the data D0 through D2 and the parity data PD are recorded dispersively in four magnetic disk storage devices 204 through 207.

Figure 4:
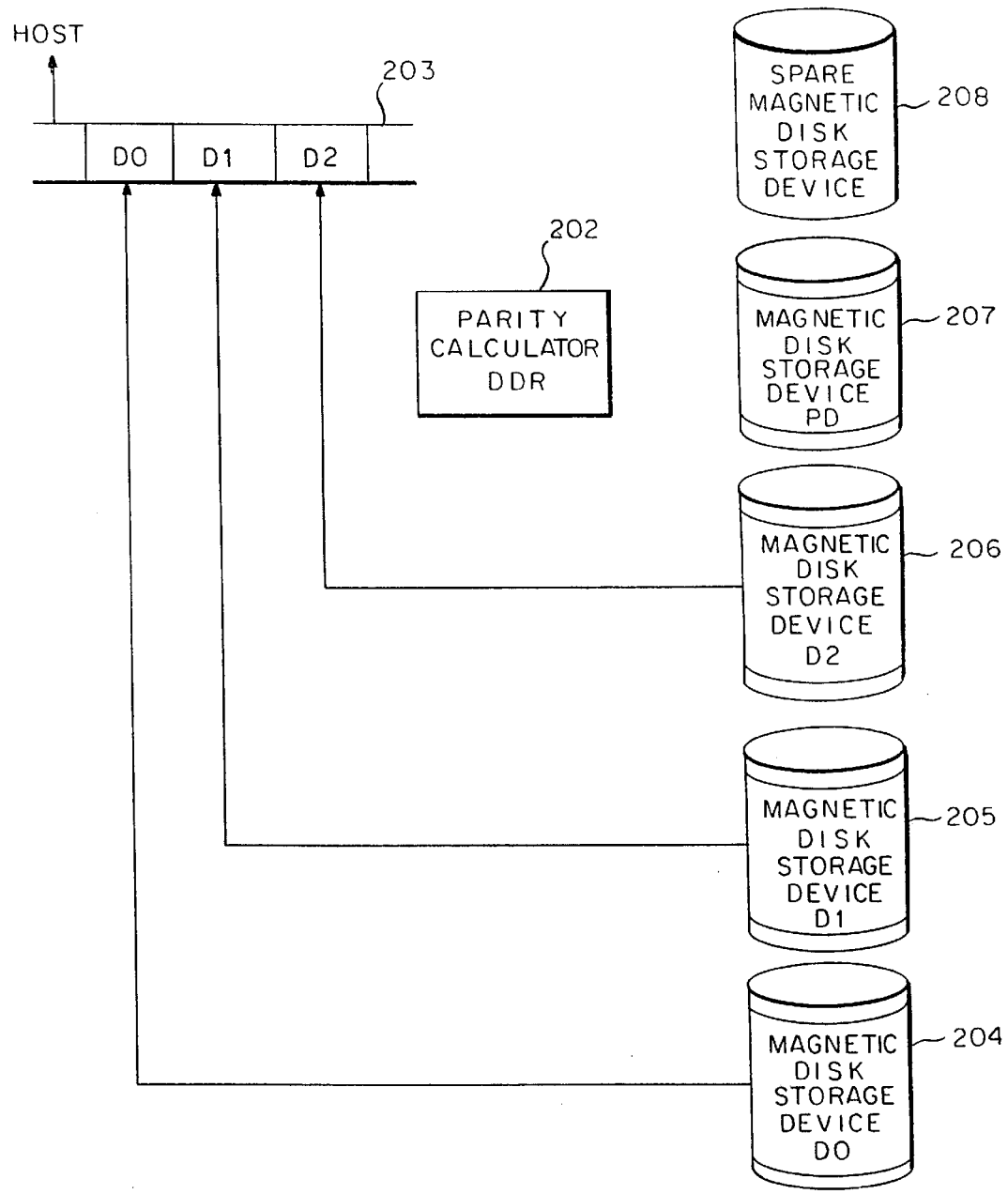
FIG. 4 is a schematic diagram illustrating the functions performed by a disk array system according to the present invention.

FIG. 4 illustrates a process where data D0 through D2 are been read out from the magnetic disk storage devices 204 through 206 for the host. The data D0 through D2 are temporarily stored in the cache memory 203, merged and issued to the host.

Figure 5:
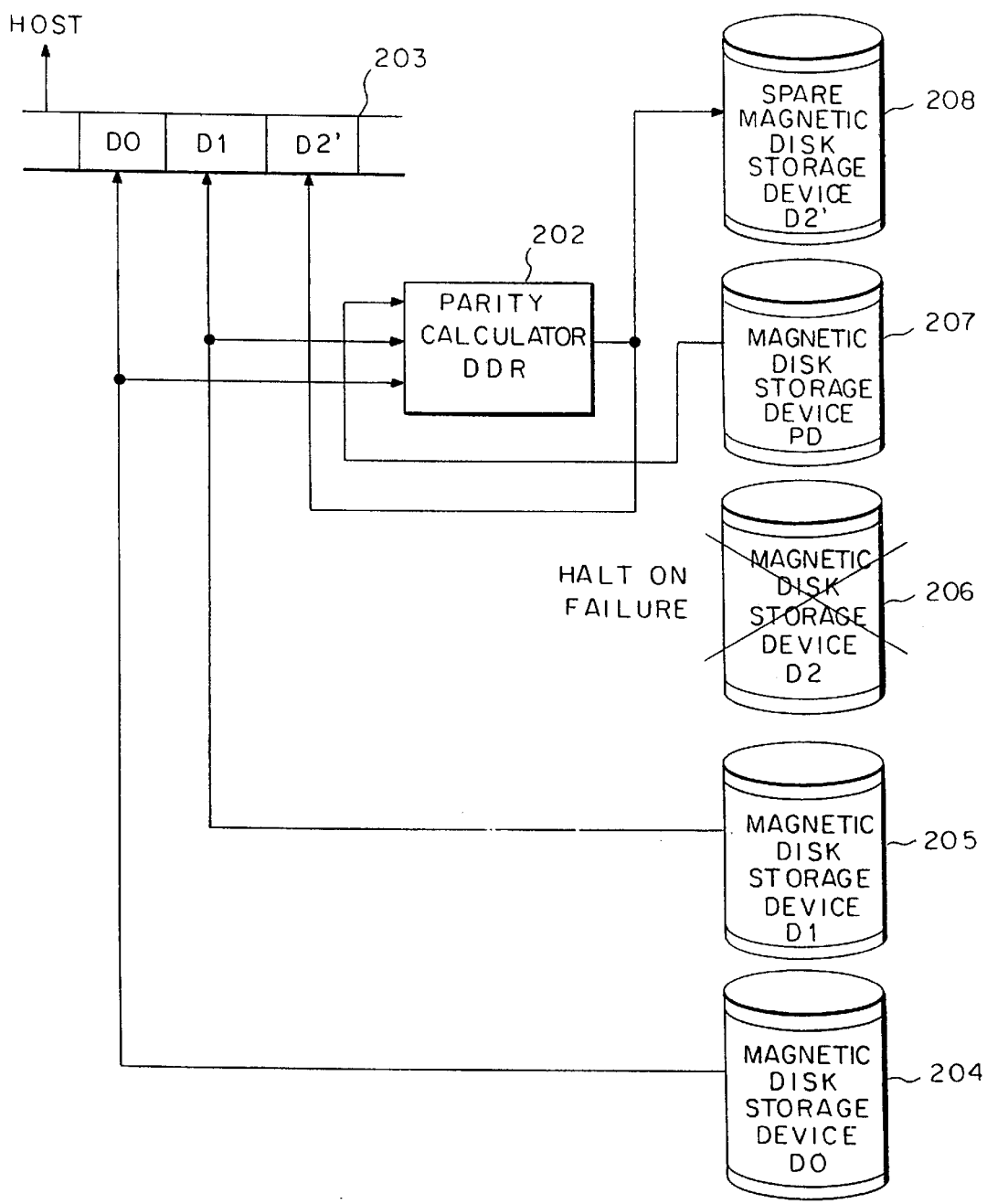
FIG. 5 is a schematic diagram illustrating the functions performed by a disk array system according to the present invention.

FIG. 5 illustrates a process to retrieve data requested by the host when the magnetic disk storage device 206 has been halted due to failure. Data D2 requested from the failed magnetic disk storage device 206 is calculated by using D0, D1 and their parity data PD through DRR 202. Calculated data D2' is transferred to the host through the cache memory 203 and are as well written to the spare magnetic disk storage device 208.

According to the present invention in a disk array system each of the magnetic disk storage devices 204 through 207 and the spare magnetic disk storage device 208 is stopped in sequence for the halt time length Ts, at a specified time interval, namely the tolerable continuous operation time Ti according to the present invention. Thus, the disk array system according to the present invention is kept operational with each magnetic disk storage device being operated according to the flowchart illustrated in FIG. 1. However, as each of the magnetic disk storage devices 204 through 207 and the spare magnetic disk storage device 208 are stopped for the halt time length Ts the halted magnetic disk storage device is not accessible.

In order to compensate for the inaccessibility of each magnetic disk storage device as it is stopped, the present invention responds to a request to read or write data in the magnetic disk storage device which has been halted in the manner described below. Namely, data to be read from the magnetic disk storage device which has been halted is calculated by using data from the other magnetic disk storage devices and the parity data through DRR 202 and data to be written to the magnetic disk storage device which has been halted is stored in an alternate memory on the spare magnetic disk storage device 208.

Figure 6:
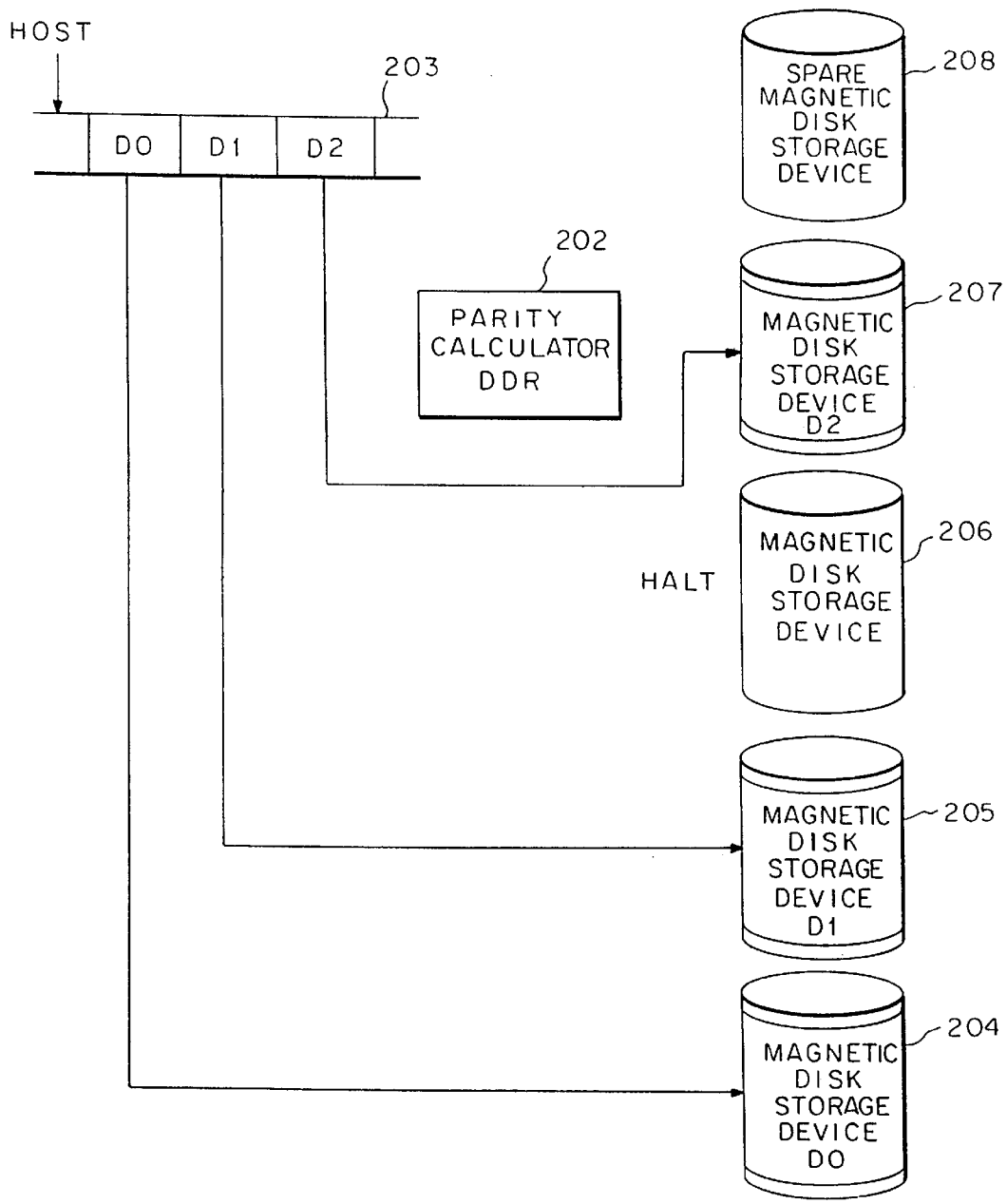
FIG. 6 is a schematic diagram illustrating the functions performed by a disk array system according to the present invention.

FIG. 6 illustrates a process according to the present invention where a request to write data D0 through D2 in the disk array system while the magnetic disk storage device 206 has been halted is issued. According to the present invention data D0 through D2 are recorded dispersively to the operating disk array (the magnetic disk storage devices 204, 205 and 207) except the magnetic disk storage device 206 which has been halted, without generating parity data PD. In this embodiment each of the magnetic disk storage devices 204 through 207 and the spare magnetic disk storage device 208 for one disk array system is stopped in sequence for the halt time length Ts, at a specified interval of operation time, namely the tolerable continuous operation time Ti according to the present invention. Thus, the disk array system is kept operational according to the present invention as illustrated in FIG. 1. However, halting each of the magnetic disk storage devices according to the present invention causes the magnetic disk storage device to become inaccessible. The inaccessibility of the magnetic disk storage device which has been halted is compensated for by using the above-described operation. Particularly, according to the present invention when a data write-in request is issued from the host the data is recorded dispersively to the magnetic disk storage devices which have not been halted without generating parity data.

Figure 7:
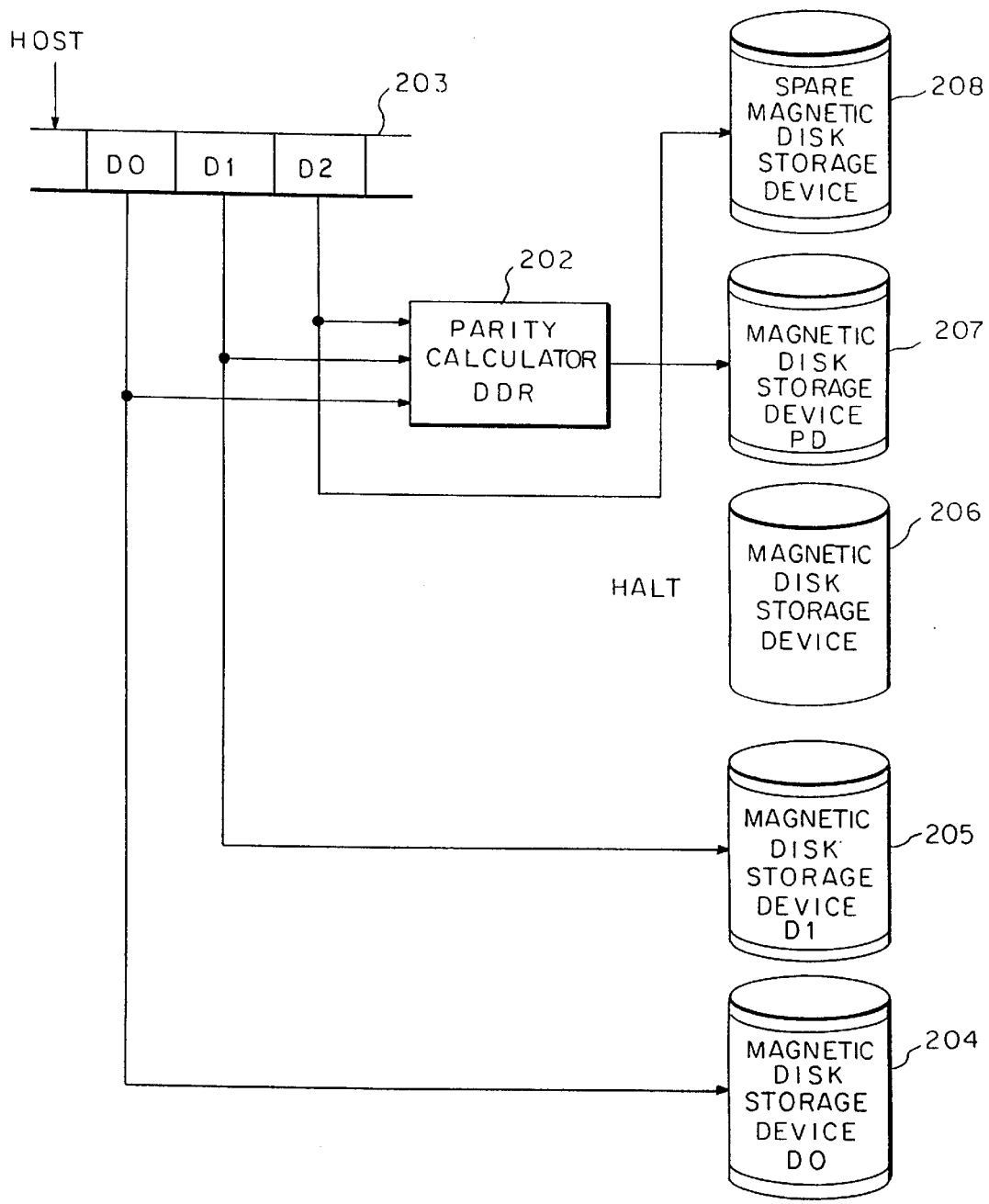
FIG. 7 is a schematic diagram illustrating the functions performed by a disk array system according to the present invention.

FIG. 7 illustrates a process according to the present invention where the spare magnetic disk storage device 208 is temporarily used as a storage area for the magnetic disk storage device 206 which has been halted. In FIG. 7 data D0 through D2 are recorded with the parity data PD generated, without deteriorating reliability of the disk array system. Generally, data D2 to be written to the magnetic disk storage device 206 is temporarily recorded to the spare magnetic disk storage device 208 and transferred to the magnetic disk storage device 206 from the spare magnetic disk storage device 208 after the magnetic disk storage device 206 has been restarted. When the magnetic disk storage devices is stopped in sequence according to the present invention. As described above, when the magnetic disk storage device is stopped it becomes inaccessible to data read and data write operations. However, according to the present invention the above-described process is conducted. Namely, data to be written to the halted magnetic disk storage device is temporarily recorded in the spare magnetic disk storage device. Thereafter, the data is transferred to the magnetic disk storage device which has been halted after it has been restarted.

Figure 8:
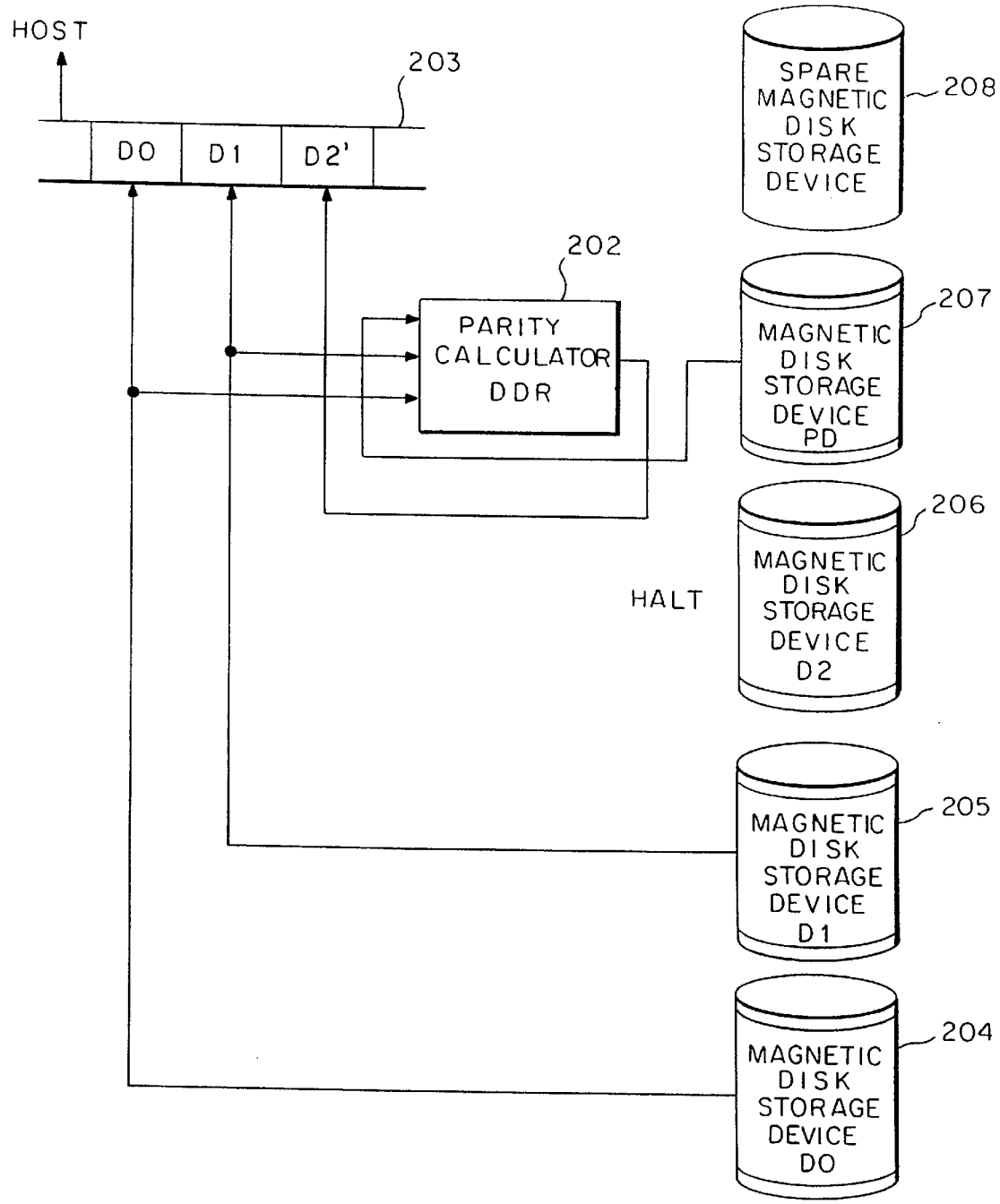
FIG. 8 is a schematic diagram illustrating the functions performed by a disk array system according to the present invention.

FIG. 8 illustrates a process according to the present invention where data D0 through D2 from the disk array system 200 in which the magnetic disk storage device 206 has been halted due to failure is issued from the host. Data D2 to be read out from the magnetic disk storage device 206 is obtained by calculating using D0, D1 and their parity data PD through DRR 202. Data D0, D1 and the calculated data D2' are stored in the cache memory 203 and then returned to the host. According to the present invention each of the magnetic disk storage devices are sequentially stopped for the halt time at a specified time interval of continuous operation times. When the magnetic disk storage device is halted according to the present invention access to the magnetic disk storage device is not possible. However, the present invention generates the read-out data to be read out from a magnetic disk storage device 206 by using the data from the other magnetic disk storage devices and the parity data. Namely, data to be read out from the magnetic disk storage device which has been halted is obtained by calculating the data based on data from the other magnetic disk storage devices and the parity data through the DRR 202. The calculated data is then stored in the cache memory 203 and thereafter issued to the host.

The operation of the disk array system 200 according to the present invention described above is explained using the flowchart in FIG. 1. For the convenience of description, suppose numbers #0 through #3 and #4 are applied for device number #n (maximum number, N, equal to 4 in this embodiment) to the plural magnetic disk storage devices 204 through 207 and the spare magnetic disk storage device 208 included in a disk array. First, the tolerable continuous operation time Ti and the halt time length Ts are established in the operation time control table 201b (step 101). The tolerable continuous operation time Ti is established to be, for example, 1000 hours. The halt time length Ts is established to be, for example, from several minutes to ten (10) hours.

Next, at the start of the operation, the operation time timer is initialized and started to measure the continuous operation time of the magnetic disk storage devices (step 102). During the system processes ordinary I/O operation (step 103) as exemplified in FIGS. 3, 4 and 5 are performed. In the meantime, the system watches whether the operation time timer count exceeds the tolerable continuous operation time Ti (step 104). If the operation time timer count has exceeded the tolerable continuous operation time, then the system operates to stop the magnetic disk storage devices 204 through 207 and the spare magnetic disk storage device 208 individually to prevent sticking between the magnetic heads 315 and the magnetic disks 316. Namely, the system initializes device number #n to zero (step 105). Thus, the system starts to measure a halt time length by starting the halt time timer (step 106), while stopping device #n (=0; the magnetic disk storage device 204) (step 107). In this moment, in the stopped magnetic disk storage device 204 the magnetic heads 315 rub the surface of the rotating magnetic disks 316 as it comes to a stop in a CSS zone 316a, thereby removing lubricants or contaminants which have accumulated among the magnetic heads and magnetic disks. As a result, the magnetic disk storage device is able to conduct a much smoother restart at a later time.

While the system processes I/O operations for one magnetic disk storage device under halt as exemplified in FIGS. 6, 7 and 8 (step 108) in response to requests from the host, it watches whether the halt time reaches a specified halt time length Ts (step 109). When the halt time has reached the halt time length Ts, the system processes to restart and recover the magnetic disk storage device of device number #n (=0) under halt (step 110). In the step 110, if a data write request has been issued during halt of the magnetic disk storage device, the system performs a process such as copying data from the spare magnetic disk storage device 208 to the restarted magnetic disk storage device as described above.

Thereafter, by judging whether current device number in has reached to the maximum device number #N (step 111), #n is increased if #n has not reached to #N (step 112) and the stopping process as per step 106 is repeated for the next magnetic disk storage device unit #N is reached.

Figure 11:
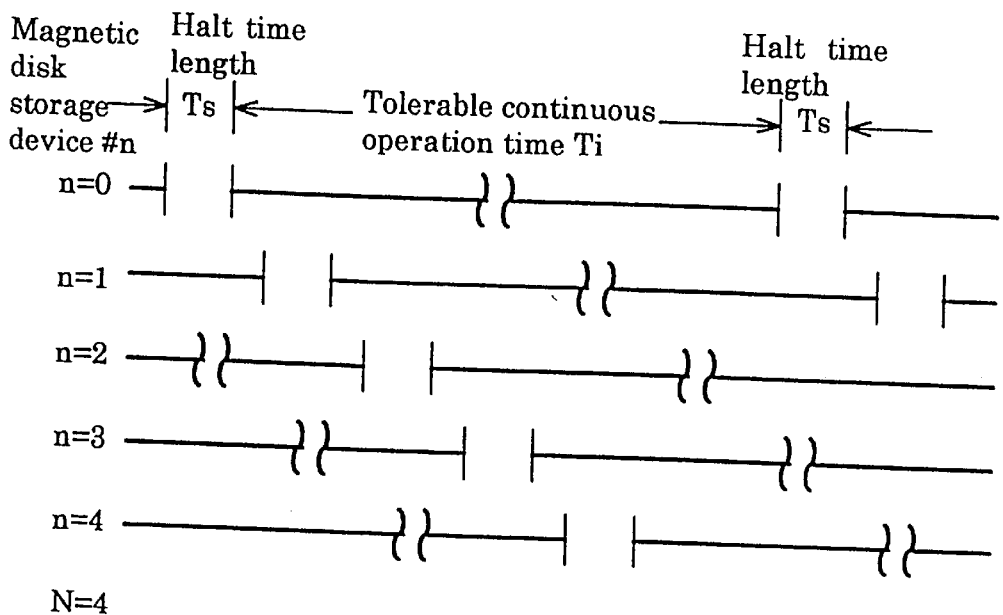
FIG. 11 is a timing chart illustrating an example of stopping operation for magnetic disk storage devices in a disk array system according to the present invention.
Figure 12:
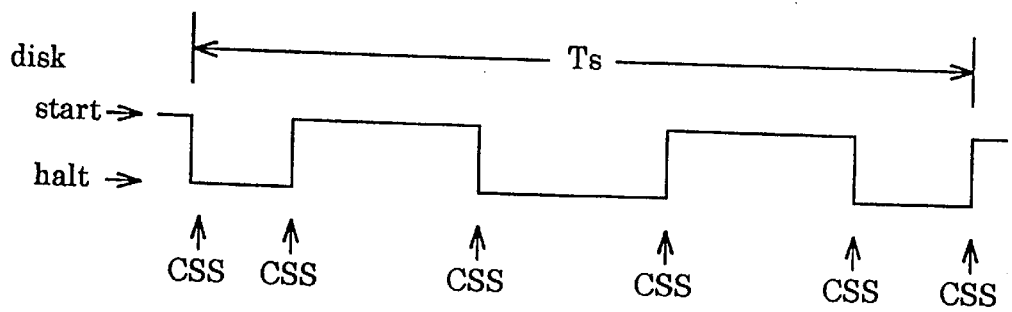
FIG. 12 is a timing chart illustrating an example of the operation of a magnetic disk storage device in a disk array system that has been halted according to the present invention.

Thus, each of the magnetic disk storage devices 204 through 207 and the spare magnetic disk storage device 208 is halted for the specified halt time length Ts, one by one in sequence to avoid overlapping the stopping process for the magnetic disk storage devices. The stopping process is repeated roughly at an interval of the tolerable continuous operation time Ti, as illustrated in a timing chart of FIG. 11. In this case, one magnetic disk storage device can intentionally repeat CSS's by repeating starting-up to a steady rotational speed and stopping several times in an oscillating manner during a halt time length Ts as exemplified in FIG. 12, thereby removing lubricants and contaminants more completely. When the current device number #n has reached the maximum device number #N, a stopping process for each of the magnetic disk storage devices is regarded as finished, and then returned to step 102. Thus, the system is restarted to begin watching the operation time of the disk array system 200.

FIG. 9 illustrates a diagram as an example explaining the result of measurement of sticking force between a magnetic head and a magnetic disk relative to the operating time of the magnetic disk storage device included in a disk array. Line A is an example of a magnetic disk storage device that has been continuously operated without stopping during operation, while line B is an example of a magnetic disk storage device that has been continuously operated with temporary stops every 1000 hours of operation. Sticking force between a magnetic head and magnetic disk for the line A exceeded 4 times the initial value of sticking force after 5000 hours of operation whereas sticking force after about 5000 hours operation for the line B was about 1.5 times or less of the initial value of sticking force. Thus, a sticking problem between a magnetic head and a magnetic disk can be avoided by continuously operating the magnetic disk storage devices with temporary stops at a specified time interval.

By applying the above-described features of the present invention to a disk array system starting-up problems that might happen simultaneously to plural magnetic disk storage devices can be prevented. Thus, the disk array system can be kept at a high degree of reliability.

Assuming, for example, the tolerable continuous operation time Ti is 1000 hours, each of the magnetic disk storage devices 204 through 207 and a spare magnetic disk storage device 208 included in the disk array is stopped for a given halt time length Ts before the continuous operation time Ti reaches 1000 hours. Conducting the stopping process in this manner reliably prevents data failures due to starting-up problems caused by the sticking of the magnetic head to the magnetic disk. More particularly, conducting the stopping processes in the above-described manner prevents severe data failure wherein the sticking of the magnetic head to the magnetic disk occurs in plural ones of the magnetic disk storage devices at the same time at restart following a temporary stop disk array after long term continuous operation of the disk array.

The above-described stopping process prevents such severe data failures due to simultaneous starting-up problems caused by sticking between the magnetic head and the magnetic disk in a number of magnetic disk storage devices exceeding a number where data integrity can be maintained by RAID functions. Such severe data failures might happen in an occasion where a disk array system 200 comprising plural magnetic disk storage devices 204 through 207 and a spare magnetic disk storage device 208 is to be restarted following the halt of the disk array system 200 due to the electrical source being turned off for the purpose of a maintenance or the like. The stopping process increases the reliability of the operation of a disk array system 200 forming a RAID and also the stored data.

The value of the tolerable continuous operation time Ti is not limited to 1000 hours, but can be chosen to an appropriate value in response to the properties of the magnetic disk storage devices in the disk array system. The present invention is not limited to the embodiment described above. For example, the present invention rather than using the alternate memory or the spare magnetic disk storage device 208 for the magnetic disk storage device which has been halted, a part of the cache memory 203 that is made non-volatile using a back-up power source can be used.

The present invention further operates such that the alternate memory which is used for a request to write data to the magnetic disk storage device which has been halt may be eliminated when time zones where no data write requests are issued from the host are provided. These time zones are predetermined to occur in each day, each week, each month, etc., by an operation schedule of the disk array system 200. The present invention provides for executing stopping processes for the individual magnetic disk storage devices in these time zones.

Executing the stopping processes exemplified in steps 105–111 of FIG. 1 during the time zones described above is realized by establishing an operation schedule on the operation time control table 201*b* in the step 101 in FIG. 1, and judging whether the present time is in a time zone where no request for data-write is issued on the step 104.

Further, when the stopping process for individual magnetic disk storage devices is started after the continuous operation time has reached the tolerable continuous operation time Ti, the stopping process for individual magnetic disk storage devices as exemplified in steps 105 to 111 can be executed in a time zone where no request for data-write is issued. The time zone where no request for data-write is issued can be determined statistically based on information on the frequency of requests for data-write from the host which are collected during the time before reaching the tolerable continuous operation time Ti.

The present invention also provides that each of the magnetic disk storage devices included in the disk array has a function of making spontaneous stops at a specified interval of continuous operation time, other than the case where the MPU controls the stopping operations mentioned above. Namely, in the case that a MPU 201 controlling the disk array system 200 and magnetic disk storage devices, a function is provided in the disk array system 200 according to the present invention for spontaneously stopping the magnetic disk storage devices.

Figure 13:
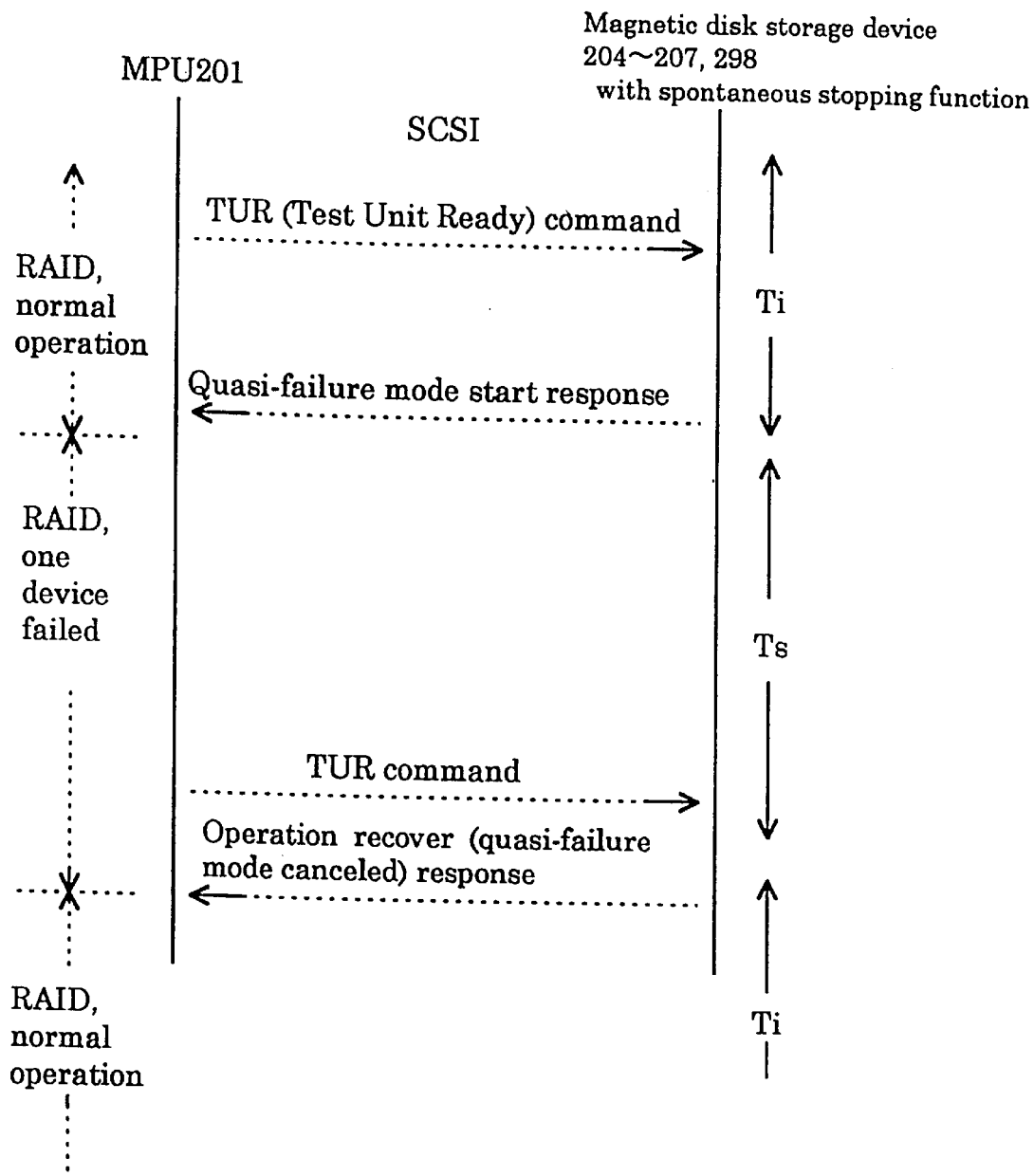
FIG. 13, is a flowchart illustrating a variation of a disk array system which functions according to the present invention.

In this regard, the MPU 201 is connected to the magnetic disk storage devices through a SCSI interface or like that as illustrated in FIG. 13. The MPU 201 periodically issues commands such as TUR (Test Unit Ready) to the magnetic disk storage device. If time has reached the tolerable continuous operation time Ti at a moment the magnetic disk storage device receives the TUR command, the magnetic disk storage device makes a spontaneous stop after informing the MPU 201 that a quasi-failure mode is to be started for a intentional stop through a vender-unique command interface or like. Taking this opportunity, the MPU 201 moves to an operation mode for the case that one device in the RAID has failed. During this, the MPU 201 continues to issue TUR command periodically to the magnetic disk storage device under halt, while, if time has reached to the specified halt time length Ts, the magnetic disk storage device informs the MPU 201 that a quasi-failure mode is to be canceled and a recovery operation performed by using the command interface mentioned above. Taking this opportunity, the MPU 201 moves to a normal operation mode that includes no failed magnetic disk storage device.

In the above case, data integrity can also be maintained by the RAID system of the disk array system and functions of the disk array system are not deteriorated. This is accomplished by shifting each time of the spontaneous stopping of the magnetic disk storage devices for an adequate time interval to avoid overlapping stopping processes of plural magnetic disk storage devices and treating the magnetic disk storage device under halt as a quasi-failure as well. Further, magnetic disk storage devices with the spontaneous stopping function have benefits to simplify the control software in the MPU 201 to realize periodic stops of individual magnetic disk storage devices where needed.

Figure 14:
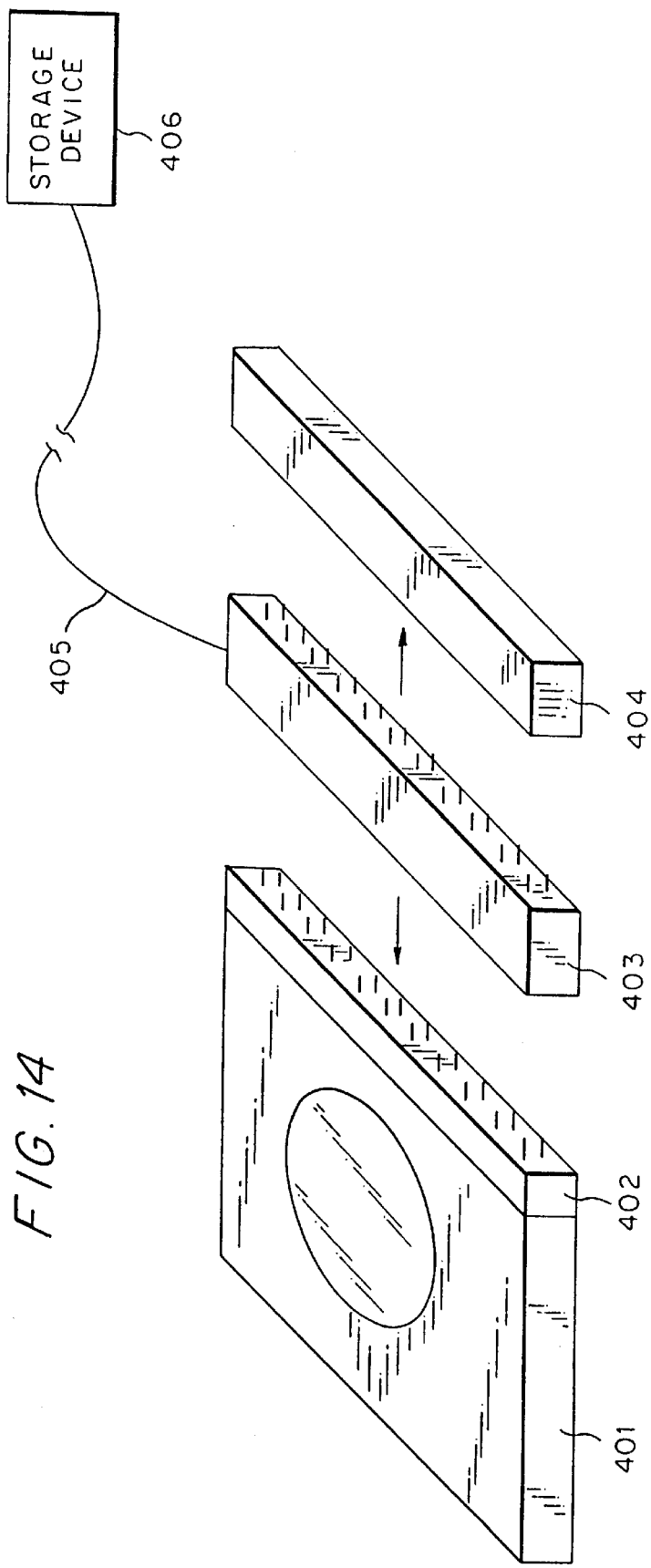
FIG. 14 is a schematic diagram illustrating the construction of a magnetic disk storage device which outputs an operational log of a magnetic disk storage device.

FIG. 14 illustrates a schematic diagram which exemplifies how to obtain an operational log of a disk storage device with a disk array system. Here, the operation log means the operating schedule of operation time Ti, halt time length Ts, etc. that are obtained about at least magnetic disk storage devices 204–207 and spare magnetic disk storage device 208. The operational log gives basic data for determination of the time zone where no request for data-write is issued. Independent magnetic disk device 401 represents the magnetic disk storage devices 204–207 and the space magnetic disk storage device 208 included in a disk array system. The operational log provides information concerning the operation time and stopping time of the magnetic disk storage devices of the disk array. A storage device 406 shown in FIG. 14 memorizes the operational log of the magnetic disk device 401. Thus, the storage device 406 obtains operational logs of magnetic disk storage devices 204 through 207 and the spare magnetic disk storage device 208 included in the disk array system. An intervening connector 403 is inserted between a connector 402 set at the magnetic disk storage device 401 and a connector 404 set at the disk array system. Ordinarily the connector 402 engages the connector 404. The connector 403 transfers signals communicated between the magnetic disk storage device 401 and the disk array system to the storage device 406 via a cable 405.

Analyzing the operational log by apparatus or the like permits the selection of various appropriate operations for each magnetic disk device. Namely, the stopping time and the interval of operation time can be selected based on the operational log. The storage device 406 may be configured to be either in the disk array, namely on one of the magnetic disk storage devices, or outside the disk array.

The method and systems for a magnetic disk storage device of the present invention has an effect that a difficulty due to starting-up problems at a restart following a halt after long term operation can be prevented. Further, the method and system for a magnetic disk storage device of the present invention has an effect that simultaneous starting-up problems due to a failure in plural magnetic disk storage devices included in a RAID system can be prevented thereby maintaining inherent high reliability of the RAID system.

The method and system for a disk array system of the present invention has an effect that when each of plural magnetic disk storage devices in a disk array are sequentially stopped to prevent starting-up problems of the magnetic disk storage devices at restart of the magnetic disk storage devices the disk array system can continue to operate and respond to data read and write requests.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of controlling a magnetic disk storage device including a magnetic disk, a magnetic head and a magnetic head suspension apparatus in which said magnetic head floats above said magnetic disk when said magnetic disk is rotating and said magnetic head contacts said magnetic disk when the rotation of said magnetic disk stops, said method comprising the steps of:

detecting a length of time that said magnetic disk has been rotating;

temporarily stopping the rotation of said magnetic disk for a predetermined period of time when said detected length of rotating time for said magnetic disk reaches a predetermined length; and resuming the rotation of said magnetic disk after the rotation of said magnetic disk has been stopped for the predetermined period of time.

2. A method according to claim 1, wherein said predetermined length of rotating time for said rotating disk is selectable.

3. A method according to claim 1, wherein the predetermined period of time for temporarily stopping rotation of said magnetic disk is selectable.

4. A method according to claim 1, wherein information of the predetermined length of rotating time for said magnetic disk and information of the predetermined period of time for temporarily stopping rotation of said magnetic disk are stored in a control table.

5. A method according to claim 1, wherein the predetermined period of time for temporarily stopping rotation of said magnetic disk and the predetermined length of rotating time for said magnetic disk are related to the type of said magnetic disk.

6. A method according to claim 1, further comprising the steps of:

outputting operational information of said magnetic disk storage device, said operational information including information concerning the predetermined length of rotating time for said magnetic disk and information concerning the predetermined period of time for temporarily stopping rotation of said magnetic disk; and storing said operational information in a memory.

7. A method according to claim 1, wherein the predetermined length of rotating time for said magnetic disk is approximately 1000 hours.

8. A method according to claim 1, wherein the predetermined period of time for temporarily stopping rotation of said magnetic disk is approximately 10 hours.

9. A method according to claim 1, wherein said steps of detecting, stopping and resuming rotation of said magnetic disk are executed repeatedly, in accordance with said predetermined length of rotating time for said magnetic disk and predetermined period of time for temporarily stopping rotating of said magnetic disk, respectively.

10. A method according to claim 1, wherein said predetermined length of rotating time for said magnetic disk is longer than the predetermined period of time for temporarily stopping rotation of said magnetic disk.

11. A method of controlling a disk array system including a plurality of magnetic disk storage devices each having a magnetic disk, a magnetic head and a magnetic head suspension apparatus, in which said magnetic head floats above said magnetic disk when said magnetic disk is rotating, and said magnetic head contacts said magnetic disk when the rotation of said magnetic disk stops, said method comprising the steps of:

detecting a length of rotating time for the magnetic disk of each of said magnetic disk storage devices;

temporarily stopping the rotation of each of said magnetic disks for a predetermined period of time when the length of rotating time for said magnetic disk reaches a predetermined length of time; and resuming the rotation of said magnetic disks after the predetermined period of time for temporarily stopping rotation has elapsed for each of said magnetic disks respectively.

12. A method according to claim 11, wherein said temporarily stopping step comprises the step of:

sequentially stopping each of said magnetic disks of said magnetic disk storage devices such that a time of stopping of one of said magnetic disks does not overlap a time of stopping of any of said other magnetic disks.

13. A method according to claim 12, further comprising the step of:

responding to a data read request for a magnetic disk which has been temporarily stopped by recovering data to be read by use of data from others of said magnetic disks which have not been temporarily stopped.

14. A method according to claim 12, further comprising the step of:

responding to a data write request for a magnetic disk which has been temporarily stopped by dispersively storing data to be written into others of said magnetic disks which have not been temporarily stopped.

15. A method according to claim 12, further comprising the steps of:

responding to a data write request for a magnetic disk which has been temporarily stopped by storing data to be written in an alternate memory; and transferring the data stored in the alternate memory to the magnetic disk which has been temporarily stopped when rotation of the magnetic disk has been resumed.

16. A method according to claim 11, wherein the predetermined length of rotating time for each of said magnetic disks is selectable.

17. A method according to claim 11, wherein a predetermined period of time for temporarily stopping rotation of each of said magnetic disks is selectable.

18. A method according to claim 11, wherein information of said predetermined length of rotating time for each of said magnetic disks and information of the predetermined period of time for temporarily stopping rotation of each of said magnetic disks are stored in a control table.

19. A method according to claim 11, wherein the predetermined period of time for temporarily stopping rotation of each of said magnetic disks and the predetermined length of rotating time for each of said magnetic disks are related to the type of said magnetic disk.

20. A method according to claim 11, further comprising the steps of:

outputting operational information of said magnetic disk storage devices, said operational information including information concerning the predetermined length of rotating time for each of said magnetic disks and information concerning the predetermined period of time for temporarily stopping rotation of each of said magnetic disks; and storing said operational information in a memory.

21. A method according to claim 11, wherein said predetermined length of rotating time for each of said magnetic disks is approximately 1000 hours.

22. A method according to claim 11, wherein the predetermined period of time for temporarily stopping rotation of each of said magnetic disks is approximately 10 hours.

23. A method according to claim 11, wherein said steps of detecting, stopping and resuming rotation of said magnetic disk are executed repeatedly, in accordance with said predetermined length of rotating time for said magnetic disk and predetermined period of time for temporarily stopping rotating of said magnetic disk, respectively.

24. A method according to claim 11, wherein said predetermined length of rotating time for said magnetic disk is longer than the predetermined period of time for temporarily stopping rotation of said magnetic disk.

25. An apparatus for controlling a magnetic disk storage device including a magnetic disk, a magnetic head and a magnetic head suspension apparatus, in which said magnetic head floats above said magnetic disk when said magnetic disk is rotating, and said magnetic head contacts said magnetic disk when the rotation of said magnetic disk stops, said apparatus comprising:

a timer which detects a length of rotating time of said magnetic disk; and a controller which temporarily stops rotation of said magnetic disk for a predetermined period of time when the detected length of rotating time of said magnetic disk reaches a predetermined length of time.

26. An apparatus according to claim 25, wherein said predetermined length of rotating time for said magnetic disk is selectable.

27. An apparatus according to claim 25, wherein the predetermined period of time for temporarily stopping rotation of said magnetic disk is selectable.

28. An apparatus according to claim 25, wherein information of the predetermined length of rotating time for said magnetic disk and information of the predetermined period of time for temporarily stopping rotation of said magnetic disk are stored in a control table.

29. An apparatus according to claim 25, wherein the predetermined period of time for temporarily stopping rotation of said magnetic disk and the predetermined length of rotating time for said magnetic disk are related to the type of said magnetic disk.

30. An apparatus according to claim 25, further comprising:

an interface which outputs operational information of said magnetic disk storage device, said operational information including information concerning the predetermined length of rotating time for said magnetic disk and information concerning the predetermined period of time for temporarily stopping rotation of said magnetic disk; and a memory which stores said operational information.

31. An apparatus according to claim 25, wherein said predetermined length of rotating time for said magnetic disk is approximately 1000 hours.

32. An apparatus according to claim 25, wherein the predetermined period of time of temporarily stopping rotation of said magnetic disk is approximately 10 hours.

33. An apparatus according to claim 25, wherein said steps of detecting, stopping and resuming rotation of said magnetic disk are executed repeatedly, in accordance with said predetermined length of rotating time for said magnetic disk and predetermined period of time for temporarily stopping rotating of said magnetic disk, respectively.

34. An apparatus according to claim 25, wherein said predetermined length of rotating time for said magnetic disk is longer than the predetermined period of time for temporarily stopping rotation of said magnetic disk.

35. An apparatus for controlling a disk array system including a plurality of magnetic disk storage devices each having a magnetic disk, a magnetic head and a magnetic head suspension apparatus, in which said magnetic head floats above said magnetic disk when said magnetic disk is rotating, and said magnetic head contacts said magnetic disk when the rotation of said magnetic disk stops, said apparatus comprising:

a timer which detects a length of rotating time for the magnetic disk of each of said magnetic disk storage devices; and a controller which temporarily stops rotation of each of said magnetic disks for a predetermined period of time when the detected length of rotating time for each of said magnetic disks reaches a predetermined length of time, respectively.

36. An apparatus according to claim 35, wherein said controller sequentially stops each of said magnetic disks of said magnetic disk storage devices such that a time of stopping of one of said magnetic disks does not overlap a time of stopping of any other of said magnetic disks.

37. An apparatus according to claim 36, wherein said controller responds to a data read request for a magnetic disk which has been temporarily stopped by recovering data to be read by use of data from the others of said magnetic disks which have not been temporarily stopped.

38. An apparatus according to claim 36, wherein said controller responds a data write request for a magnetic disk which has been temporarily stopped by dispersively storing data to be written into others of said magnetic disks which have not been temporarily stopped.

39. An apparatus according to claim 36, wherein said controller responds to a data write request for a magnetic disk which has been temporarily stopped by storing data to be written in an alternate memory and transfers the data stored in the alternate memory to the magnetic disk which has been temporarily stopped when rotation of the magnetic disk has been resumed.

40. An apparatus according to claim 35, wherein the predetermined length of rotating time for each of said magnetic disks is selectable.

41. An apparatus according to claim 35, wherein the predetermined period of time for temporarily stopping rotation of each of said magnetic disks is selectable.

42. An apparatus according to claim 35, wherein information of the predetermined length of rotating time for each of said magnetic disks and information of the predetermined period of time for temporarily stopping rotation of each of said magnetic disks are stored in a control table.

43. An apparatus according to claim 35, wherein the predetermined period of time for temporarily stopping rotation of each of said magnetic disks and the predetermined length of rotating time for each of said magnetic disks are related to the type of said magnetic disk.

44. An apparatus according to claim 35, further comprising:

an interface which outputs operational information of said magnetic disk storage devices, said operational information including information concerning the predetermined length of rotating time for each of said magnetic disks and information concerning a predetermined period of time for temporarily stopping rotation of each of said magnetic disks; and a memory which stores said operational information.

45. An apparatus according to claim 35, wherein the predetermined length of rotating time for each of said magnetic disks is approximately 1000 hours.

46. An apparatus according to claim 35, wherein the predetermined period of time for temporarily stopping rotation of each of said magnetic disks is approximately 10 hours.

47. An apparatus according to claim 35, wherein said steps of detecting, stopping and resuming rotation of said magnetic disk are executed repeatedly, in accordance with said predetermined length of rotating time for said magnetic disk and predetermined period of time for temporarily stopping rotating of said magnetic disk, respectively.

48. An apparatus according to claim 35, wherein said predetermined length of rotating time for said magnetic disk is longer than the predetermined period of time for temporarily stopping rotation of said magnetic disk.

* * * * *